F. W. ROBERTSHAW

THERMOSTAT

Jan. 12, 1932.

Re. 18,330

Original Filed Oct. 30, 1923

INVENTOR

Frederick W. Robertshaw, by Byrnes, Lalbrie & Parmelee, his atty.

Reissued Jan. 12, 1932

Re. 18,330

UNITED STATES PATENT OFFICE

FREDERICK W. ROBERTSHAW, OF PITTSBURGH, PENNSYLVANIA, ASSIGNOR TO ROBERTSHAW THERMOSTAT COMPANY, OF YOUNGWOOD, PENNSYLVANIA, A CORPORATION OF PENNSYLVANIA

THERMOSTAT

Original No. 1,584,401, dated May 11, 1926, Serial No. 671,694, filed October 30, 1923. Application for reissue filed October 28, 1926. Serial No. 144,865.

The present invention relates broadly to thermostats, and more particularly to thermostats of the type adapted for use in gas heated installations in which the supply of gas is controlled by the thermostat in accordance with variations in the temperature.

In thermostats of this character comprising relatively expansible and non-expansible elements, it is desirable to provide convenient means for setting the thermostats, whereby they may be caused to operate at any desired temperature. In accordance with the present invention, this is conveniently accomplished by providing intermediate the relatively expansible and non-expansible elements, which may be termed the heat responsive means, and the heat controlling means, which may be in the form of a gas valve, a pressure communicating means so constructed that its effective over-all length may be easily varied to correspondingly vary the effect of the heat responsive means on the heat controlling means.

Still another object of the present invention is to provide an improved thermostat construction whereby the assembly of the parts is facilitated, the length of the thermostat reduced, and the operation of the adjusting means simplified.

In the accompanying drawings, there is shown for purposes of illustration only, a preferred embodiment of the present invention, it being understood that the drawings do not define the limits of the invention, as changes in the construction and operation as disclosed therein may be made without departing from the spirit of the invention or scope of my broader claims.

Figure 1:
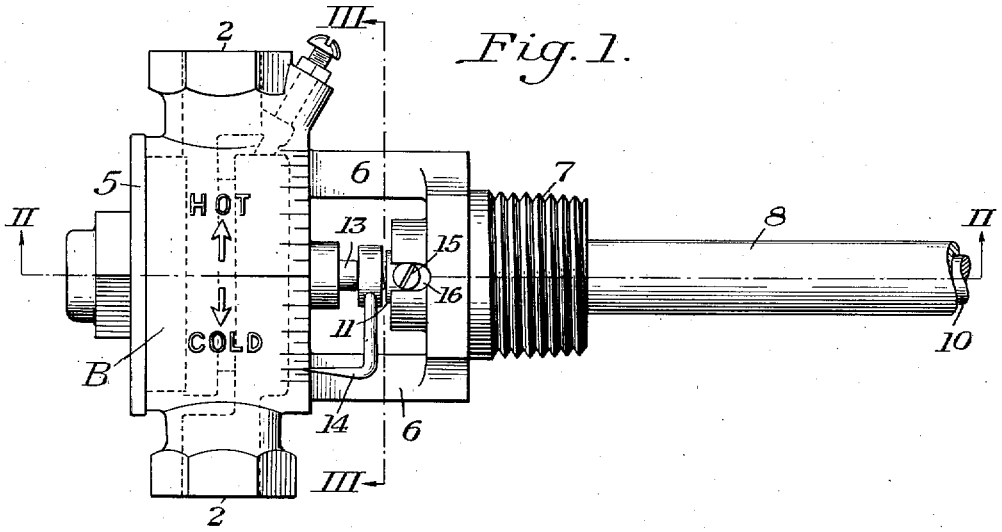
Figure 1 is a side elevation of a thermostat embodying the invention.
Figure 2:
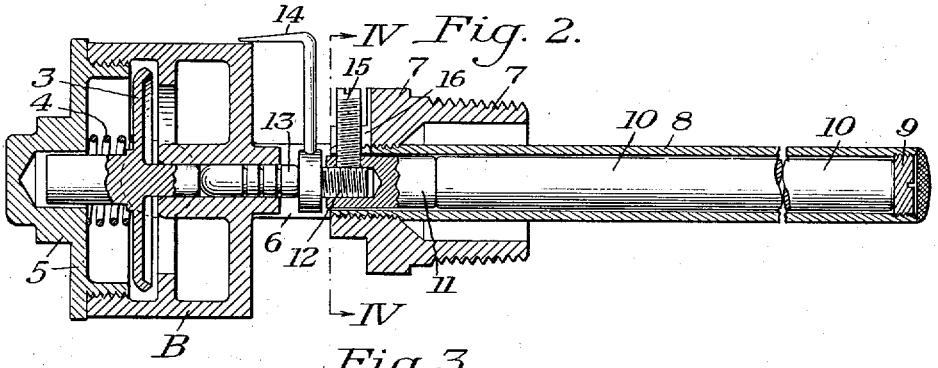
Figure 2 is a longitudinal sectional view on the line II—II of Figure 1 but with the indicator in upright position.
Figure 3:
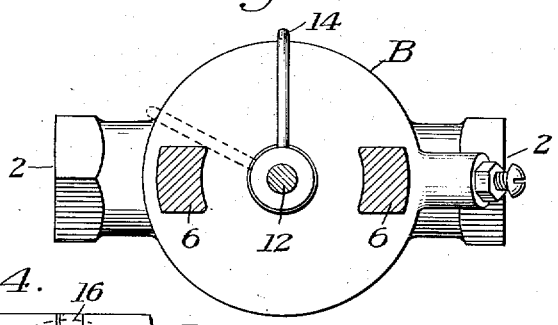
Figure 3 is a transverse sectional view on the line III—III of Figure 1.
Figure 4:
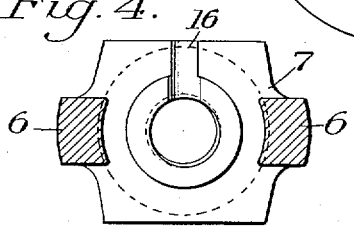
Figure 4 is a transverse sectional view on the line IV—IV of Figure 2 but showing only the thermostat body.

In the illustrated embodiment of the invention, there is provided a valve body B having inlet and outlet openings 2 and a controlling valve 3 for controlling the gas flow therebetween. The valve is preferably of the type normally urged in one direction by a spring 4 abutting at one end against the valve and at its opposite end against the inner surface of a removable cap 5, by means of which access to the interior of the valve, without disturbing the thermostat setting, is made possible.

Carried by the valve body and extending rearwardly therefrom is a supporting yoke, comprising spaced arms 6 carrying a threaded extension 7, by means of which the valve body is secured in operative position.

The heat responsive means may conveniently comprise an expansion tube 8 threaded at one end into the extension 7 and closed at its opposite end by a plug 9. Within this expansible tube there is provided a relatively non-expansible element 10 abutting at one end against the plug 9 and at its opposite end against the regulating screw plug 11. The regulating screw plug is preferably of such diameter that it may be slipped into position within the open end of the tube 8, and thereby facilitate assembly of the parts. The regulating screw plug is in turn adapted to transmit operating pressure to the valve 3 in opposition to the action of the spring 4 through the medium of a regulating screw 12 and a packing pin 13. The regulating screw has projecting therefrom an operating finger 14 shaped to cooperate with suitable graduations formed on the valve body.

From the foregoing it will be apparent that by moving the operating finger in the direction of the arrow designating "Cold" on the valve body, the regulating screw will be threaded into the regulating screw plug 11, thereby shortening the over-all length of the screw plug and screw. With the parts in this position, a relatively greater closing movement of the valve 3 under the influence of the spring 4 will take place than if the finger is moved in the opposite direction to thread the regulating screw out of the regulating screw plug. In this manner, it is possible to easily change the temperatures at which the heat responsive means becomes effective for producing a given movement of the valve. For holding the parts in their adjusted positions, there may be provided a regulating set screw 15 threaded transversely through the regulating screw plug and adapted to engage the regulating screw 12. This regulating set screw also holds the regulating screw plug against rotational movement in the tube 8 by passing through a slot 16 formed in a projecting boss on the extension 7 and in the tube 8.

Due to the fact that the regulating finger 14 is operable between the arms 6, it will be apparent that these arms serve as stops preventing the finger from being moved to such an extent that the original thermostat setting is lost. The packing pin 13, due to its loose bearing connection against the valve stem at one end and the regulating screw 12 at its other end, effectively transmits the desired operating pressures to the valve without any binding tendency.

The advantages of the present invention arise from the provision of improved means intermediate the heat responsive means and the heat controlling means for easily varying the effective temperature range of the thermostat.

Still further advantage arise from the provision of a construction in which the expansible tube is threaded into and through the extension 7 on the valve body, thereby providing a rigid mounting for the heat responsive means, a guide for the regulating screw plug, and a corresponding shortening of the overall length of the thermostat.

I claim:

1. A thermostat, including a body having a slot therein, heat responsive means, heat controlling means regulable thereby, pressure communicating means between the heat responsive means and the heat controlling means, said pressure communicating means including a plug, a regulating screw threaded thereinto and adapted to be screwed into and out of the plug for varying the effective length of the pressure communicating means, and a set screw threaded in the plug for locking the regulating screw against movement relative to the plug, said set screw extending through said slot for preventing rotation of the plug, substantially as described.

2. A thermostat comprising a valve casing, a yoke having spaced arms, a holder on said yoke, heat responsive means carried by said holder, heat controlling means within said casing regulable by said heat responsive means, a slidable pressure communicating means between the heat responsive means and the heat controlling means freely abutting through substantially smooth and regular surfaces free from any guiding projections, both the heat controlling means and the heat responsive means and movably guided within said holder, said pressure communicating means being so constructed as not to restrict bodily lateral movement between the same and either the heat responsive or the heat controlling means, said pressure communicating means including means for varying the length thereof, said pressure communicating means having a positively limited range of adjustment, and an indicating scale cooperating therewith, substantially as described.

3. A thermostat having heat responsive means, including a tubular relatively expansible member and a relatively non-expansible member carried therein, heat controlling means regulable thereby, a sliding regulating plug abutting against said relatively non-expansible member within and projecting from said tubular member and between the relatively non-expansible member and the heat controlling means, rotatable means for varying the effective length of the plug and having abutting engagement only with the heat controlling means, both of said abutting engagements including substantially plane surfaces free from guiding projections and depressions, means limiting the arc of rotation of said rotatable means, said plug being continuously out of engagement with said limiting means, and a scale cooperating with said rotatable means, substantially as described.

4. A thermostat having heat responsive means, heat controlling means regulable thereby, pressure communicating means between the heat responsive means and the heat controlling means including a plug and a screw having a threaded connection therewith and adapted to be threaded into and out of the plug for varying the effective length of the pressure communicating means, said plug and screw having abutting engagement only with the parts between which they communicate pressure, said abutting engagements including plane surfaces free from guiding means, and means for holding said plug and screw in adjusted position and preventing rotation of said plug and screw while permitting free sliding movement thereof, substantially as described.

5. A thermostat having heat responsive means, heat controlling means regulable thereby, pressure communicating means between the heat responsive means and the heat controlling means including a plug and a screw having a threaded connection therewith for varying the effective length of the pressure communicating means, and a single means adjustable at will for preventing movement of said screw with respect to said plug and for holding said plug against rotation, substantially as described.

6. In a thermostat, heat responsive means including a holder, controlling means regulable thereby, a body carrying said controlling means and to which the holder is secured, pressure communicating means between the controlling means and the heat responsive means, the portion of the pressure communicating means exteriorly of said body being guided entirely by said holder, and a single means passing through said holder for preventing rotational movement of said pressure communicating means, substantially as described.

7. In a thermostat, a casing having an inlet and outlet opening, a valve adapted to control the flow between said openings, a projection on said casing, a thermostat carried by said projection, means extending into said projection and intermediate the valve and thermostat and having abutting engagement only with both the valve and the thermostat for transmitting pressure from the thermostat to the valve, both of said abutting engagements including smooth and regular surfaces free from guiding means, means intermediate the casing and thermostat for varying the effective length of said pressure transmitting means, said projection limiting the operation of said last mentioned means, substantially as described.

8. In a thermostat, a valve casing having an inlet and an outlet opening, a valve adapted to control the flow between said openings, a packing pin projecting rearwardly from said valve and separate therefrom, a projection on said casing, a thermostat carried by said casing and comprising an expansible tube and a relatively non-expansible member mounted therein, a plug abutting against said relatively non-expansible member and guided by said tube, means extending outwardly from said plug and through the projection for preventing rotation of the plug, and an adjusting screw cooperating with said plug and having a plane surface cooperating with said packing pin, substantially as described.

9. In a thermostat, a valve casing, a heat responsive mechanism, a valve in said casing for operation by said heat responsive mechanism, a body connecting said casing and heat responsive mechanism, a plurality of freely abutting members guided only at their ends remote from the abutting engagement and constituting operating means between the valve and heat responsive mechanism, one of the abutting members having a plane abutting surface, means having threaded engagement with one of said members for varying the effective over-all length of said members, means for limiting the rotation of said last mentioned means, and means preventing rotation of one of said members, substantially as described.

10. In a thermostat, a valve casing, a heat responsive mechanism, a valve in said casing for operation by said heat responsive mechanism, a body connecting said casing and heat responsive mechanism, a plurality of freely abutting members guided only at their ends remote from the abutting engagement and constituting operating means between the valve and heat responsive mechanism, one of the abutting members having a plane abutting surface, thrust means having threaded engagement with one of said members for varying the effective over-all length of said members, and means preventing rotation of one of said members, said body forming a stop limiting rotational movement between said thrust means and the member with which it has threaded engagement, substantially as described.

11. A thermostat, including heat responsive means, comprising a tubular expansible member and a relative non-expansible member therein, heat controlling means regulable thereby, a body connecting the heat controlling means and the heat expansive means, and pressure communicating means between the heat controlling means and heat responsive means and having only abutting engagement with each of said means, one of said abutting engagements including a plane surface free from any guiding projection, said pressure communicating means including a screw for varying the effective length of the pressure communicating means and a finger for rotating the screw, said body forming a stop intermediate the heat responsive means and heat controlling means for limiting such rotation, and said tubular member being constructed to receive and form a guide for said pressure communicating means, substantially as described.

12. A thermostat, including heat responsive means, heat controlling means regulable thereby, a body connecting the heat controlling means and the heat responsive means, and pressure communicating means between the heat controlling means and heat responsive means and having abutting engagement only with each of said means through the medium of substantially smooth and regular surfaces free from any guiding means, said pressure communicating means including a screw for varying the effective length thereof, said body having spaced sides, said pressure communicating means being mounted intermediate said spaced sides and out of guiding engagement therewith.

13. A thermostat having heat responsive means, heat controlling means regulable thereby, pressure communicating means between the heat responsive means and the heat controlling means including a plug and a screw having a threaded connection for varying the effective length of the pressure communicating means, said pressure communicating means having abutting engagement only with both the heat responsive and the heat controlling means through substantially smooth and regular surfaces free from guiding projections, and means adjustable at will for preventing movement of said screw with respect to said plug and for holding said plug against rotation, substantially as described.

14. A thermostat having heat responsive means, heat controlling means regulable thereby, a multi-part pressure communicating means between the heat responsive means and the heat controlling means including a plug and a screw having a threaded connection therewith for varying the effective length of the pressure communicating means, a single means cooperating with one part of said pressure communicating means for preventing undesirable rotation of such part, and means for effecting relative rotation between the parts of said pressure communicating means, said last mentioned means having a limited arc of rotation only.

15. In a thermostat, a valve, a temperature responsive means, a pressure transmitting assembly intermediate the valve and temperature responsive means including axially arranged parts having abutting engagement only one with the other, each of the parts of said assembly being structurally separate from the valve and temperature responsive means, and means for increasing or decreasing at will the over-all length of one of said axially arranged parts.

16. In a thermostat, a valve, temperature responsive means, a pressure transmitting assembly intermediate the valve and temperature responsive means including axially arranged parts having abutting engagement only between such parts, said abutting engagement being free from any guiding and centering means, each of the parts of said assembly being structurally separate from the valve and temperature responsive means, and means for increasing or decreasing at will the over-all length of one of said axially arranged parts.

17. In a thermostat, a valve, a temperature responsive means, a pressure transmitting assembly intermediate the valve and temperature responsive means including axially arranged parts having abutting engagement only one with the other, each of the parts of said assembly being structurally separate from the valve and temperature responsive means, and having abutting engagement only therewith, and means for increasing or decreasing at will the over-all length of one of said axially arranged parts.

18. In a thermostat, a valve, temperature responsive means, a pressure transmitting assembly intermediate the valve and temperature responsive means including axially arranged parts having abutting engagement only between such parts, said abutting engagement being free from any guiding and centering means, each of the parts of said assembly being structurally separate from the valve and temperature responsive means, and having abutting engagement only therewith, and means for increasing or decreasing at will the over-all length of one of said axially arranged parts.

19. A thermostat, including heat responsive means, heat controlling means regulable thereby, a body connecting the heat controlling means and the heat responsive means, and pressure communicating means between the heat controlling means and the heat responsive means including a screw for varying the effective length of the pressure communicating means, said pressure communicating means being constructed to provide abutting engagement only at one end between the heat controlling means and abutting engagement only at the opposite end between the heat responsive means, one of said abutting engagements including a substantially flat surface having all portions thereof in an area greater than the cross sectional area of the smaller of the abutting members lying in a common plane substantially normal to the direction of pressure transmission, and spaced sides on said body, said pressure communicating means being mounted intermediate said spaced sides and entirely out of guiding engagement therewith.

In testimony whereof I have hereunto set my hand.

FREDERICK W. ROBERTSHAW.